No. 852,442. PATENTED MAY 7, 1907.
S. T. LOCKWOOD.
PROCESS OF REFINING LARD AND RECOVERING WASTE LARD FROM SPENT FULLERS' EARTH.
APPLICATION FILED JULY 20, 1906.
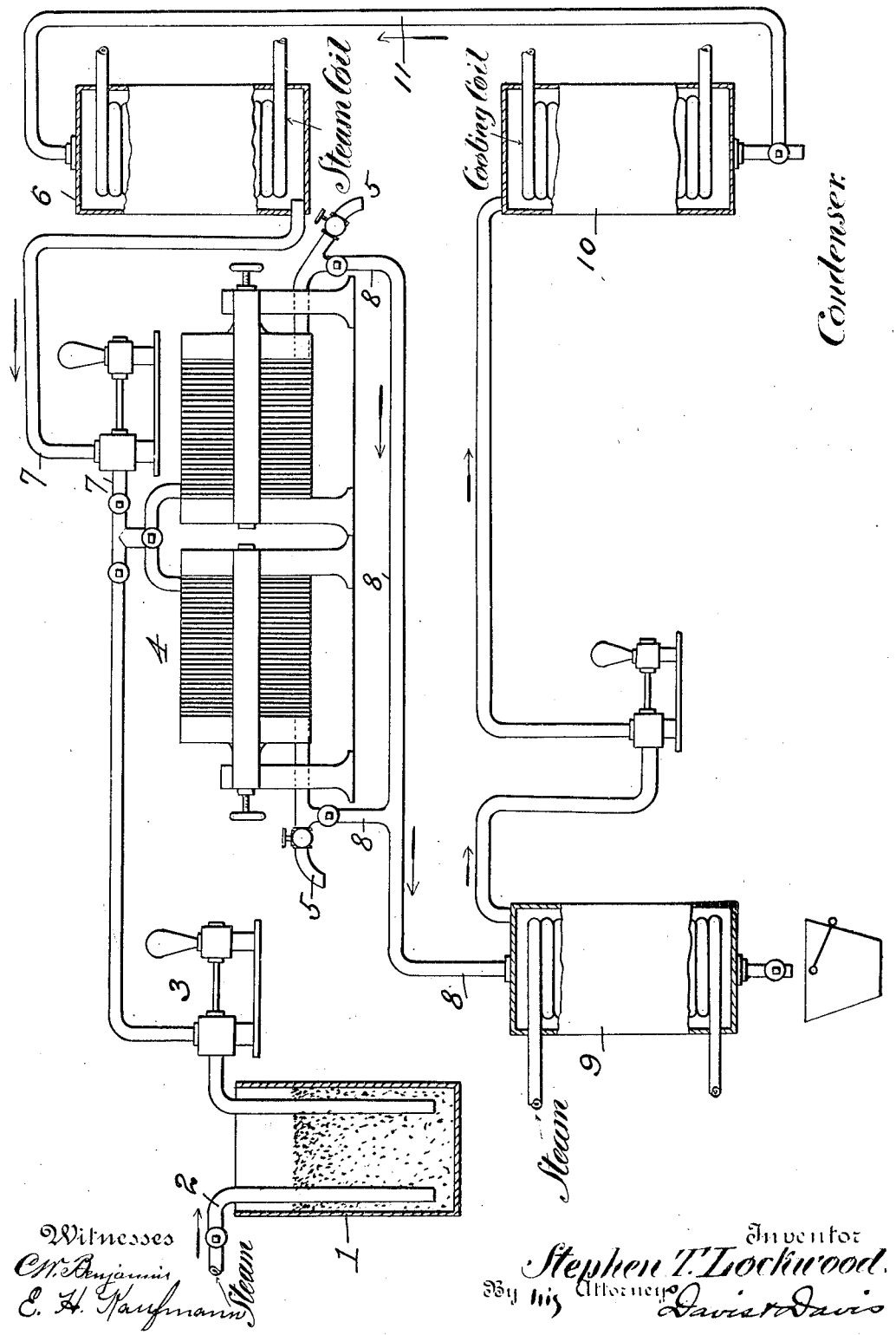

UNITED STATES PATENT OFFICE.

STEPHEN T. LOCKWOOD, OF BUFFALO, NEW YORK.

PROCESS OF REFINING LARD AND RECOVERING WASTE LARD FROM SPENT FULLERS' EARTH.

No. 852,442.　　　　　Specification of Letters Patent.　　　　Patented May 7, 1907.

Application filed July 20, 1906. Serial No. 326,992.

*To all whom it may concern:*

Be it known that I, STEPHEN T. LOCKWOOD, a citizen of the United States, residing in the city of Buffalo, county of Erie, and State of New York, have invented certain new and useful Improvements in Processes of Refining Lard and Recovering Waste Lard from Spent Fullers' Earth, of which the following is a specification, reference being had therein to the accompanying drawing, in which the figure represents a diagrammatic view of an apparatus for carrying out the process.

In the ordinary method or process of lard purification the lard is mixed with fuller's earth and is then heated in a suitable tank or receptacle to fluidity, with live steam. This fluid mixture is pumped into a filter-press by means of which the fuller's earth is gathered in cakes in the cloths of the press while the purified lard is discharged through the outlets. The cakes of fuller's earth, when removed from the filter-press are, in weight, about $12\frac{1}{2}\%$ lard, which lard heretofore was lost; and the fuller's earth containing such lard was unfit for further use by reason of such lard content.

It is the main object of the invention to recover this lost material, and at the same time to regenerate the spent fuller's earth to such an extent that it may be again used in the purifying process. I accomplish this preferably by the use of the solvent known as carbon tetrachlorid but, of course, I may make use of any other solvent having practically the same chemical properties in the same proportions, the same being used as hereinafter described.

Referring to the various parts illustrated in the drawing, 1 designates a suitable tank into which the lard and fuller's earth are introduced and heated by means of live steam which enters said vat through the pipe 2. I may heat this mixture by any other suitable means. The fluid mixture is pumped by means of the pump 3 from said tank to the filter-press 4. By means of this press the purified lard is forced from the fuller's earth and passes from said press through the outlet 5. The fuller's earth is retained in the press, cakes thereof being formed between the cloths of the press.

When the press has been operated to its fullest extent and cakes of fuller's earth are formed therein, carbon tetrachlorid is forced into the press from a tank 6 through pipe 7. A suitable pressure is maintained on the liquid by a pump or other means whereby the solvent may be forced through the cakes in the filter-press under the proper pressure. The solvent containing the lard in solution passes from the press through the outlets therefrom and into pipe 8 which leads said solution to a distilling apparatus 9. In this apparatus the carbon tetrachlorid is vaporized, leaving the purified lard therein. The carbon tetrachlorid vapor is condensed in the condenser 10 and is then passed back into the tank 6 through pipe 11.

When all of the recoverable lard has been dissolved from the cakes of fuller's earth in the press, the flow of carbon tetrachlorid to the press is shut off and the cakes of fuller's earth removed from the press. When these cakes are dried and pulverized they may be used again in the tank 1 as said earth has been practically regenerated or returned to its original condition and given again its peculiar property of absorbing lard or other grease.

The lard remaining in the apparatus 9 may be drawn therefrom in any suitable manner and will be found to be very pure and clean.

I have found that an amount of lard equal to $11\frac{1}{2}\%$ of the weight of the cakes may be recovered by this process from the cakes of fuller's earth, and that said lard is clear and pure.

The great advantage of this invention will be readily appreciated when it is understood that there are tons of spent fuller's earth, $12\frac{1}{2}\%$ of the weight of which is lard, wasted every day in plants for refining lard, and that the recoverable lard contents of said fuller's earth are worth about 12 cents a pound. The advantage of this invention will be further appreciated when it is understood that this refined or cleaned fuller's earth is in all respects the same as new fuller's earth costing $15 a ton.

Carbon tetrachlorid, sometimes called "chloro-carbon," sometimes "tetrachloromethane," has the chemical formula $CCl_4$. It is a heavy, stable, colorless, transparent, liquid compound, insoluble in water; soluble in alcohol and in ether; spceific gravity 1.56 (1.60); boils at 78° cent. (172.4° F.).

While I have described my invention as applied to refining and recovering waste lard, I desire it understood that the process may be used in refining and recovering waste tallow and other fats and grease. It will, of course, be understood, that I do not wish to be limited to the solvent known as carbon tetrachlorid, and I reserve the right to use any similar chemical or chemical combination having the same chemical properties which, when used in a similar manner, will produce the same results.

It will, of course, be understood, that the apparatus illustrated will be provided with suitable check valves and way valves to secure the proper operation thereof.

The type of filter-press used in this process is known as the closed type, and I prefer to use the Perrin closed press so that the apparatus is entirely closed and the tetrachlorid is not exposed to the atmosphere during the entire operation.

Having thus described my invention, what I claim as new and desire to secure by Letters Patent, is:—

1. The process of refining lard consisting of mixing lard with fuller's earth, passing said mixture through a filter-press to separate the lard from the fuller's earth, and then passing carbon tetrachlorid through the cakes of fuller's earth, and then distilling the carbon tetrachlorid solution to vaporize the carbon tetrachlorid and deposit the lard.

2. The process of refining lard consisting of mixing lard with fuller's earth, heating the same to fluidity, passing said fluid mixture through a filter-press to separate the lard from the fuller's earth, and then passing carbon tetrachlorid, under pressure, through said spent fuller's earth, distilling the solution to vaporize the carbon tetrachlorid and deposit the lard, and then condensing the carbon tetrachlorid vapors.

3. The process of refining lard consisting in mixing lard and fuller's earth, heating the same to fluidity, forcing said fluid mixture into a filter-press to recover the fuller's earth in cakes and separate it from the lard, subjecting said cakes of fuller's earth to carbon tetrachlorid, whereby the lard will be dissolved and removed from said cakes of fuller's earth, said fuller's earth being thereby so cleaned and regenerated that it may be again used in the refining process, then distilling the carbon tetrachlorid and lard solution to vaporize the carbon tetrachlorid and deposit the lard, and then condensing the vapors of the carbon tetrachlorid.

4. The process of refining lard consisting of mixing the same with fuller's earth, heating the mixture to fluidity, forcing the mixture through a filter-press to force the lard from the fuller's earth, then forcing the solvent of lard through said filter-press, under pressure, to dissolve the lard from the fuller's earth, then distilling said solution to vaporize the solvent and deposit the lard and then condensing said vaporized solvent.

5. The process of refining lard consisting of mixing the lard with a refining or clarifying medium, heating the mixture to fluidity, forcing said mixture through a filter-press, then forcing the solvent of lard through said press, then distilling the solvent solution to recover the lard contained therein and then condensing the solvent vapors.

6. The process of refining lard consisting of mixing the lard with a refining or clarifying medium, heating the mixture to fluidity, forcing said fluid through a filter press, then forcing the carbon tetrachlorid through the deposited material in said press, then distilling the carbon tetrachlorid to recover the lard contained therein, and then condensing the carbon tetrachlorid vapors.

7. The process of refining fatty material consisting of mixing the said material with an earthy refining or clarifying medium, heating the mixture to fluidity, forcing said fluid through a filter-press, then passing a solvent of fatty material through said press, then distilling the solvent solution to recover the fatty material contained therein and then condensing the solvent vapors.

8. The process of refining lard consisting of mixing lard with an insoluble refining or clarifying medium, heating the mixture to fluidity, forcing said fluid through a filter-press, then passing carbon tetrachlorid through the deposited material in said press, then distilling the carbon tetrachlorid to recover the lard contained therein, and then condensing the carbon tetrachlorid vapors.

In testimony whereof I hereunto affix my signature in the presence of two witnesses this 14th day of July 1906.

STEPHEN T. LOCKWOOD.

Witnesses:
WILLIAM A. GERECKE,
MERTON S. GIBBS.